United States Patent
Liang et al.

(10) Patent No.: US 12,479,987 B2
(45) Date of Patent: Nov. 25, 2025

(54) ETHYLENE VINYL ESTER BASED COPOLYMER SAPONIFIED PELLETS AND FILM CONTAINING THE SAME

(71) Applicant: CHANG CHUN PETROCHEMICAL CO., LTD., Taipei (TW)

(72) Inventors: Chih Chieh Liang, Taipei (TW); Shih Yuan Su, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 17/496,443

(22) Filed: Oct. 7, 2021

(65) Prior Publication Data

US 2022/0372261 A1  Nov. 24, 2022

(30) Foreign Application Priority Data

May 11, 2021  (CN) .......................... 202110513512.8
May 11, 2021  (TW) ................................ 110116886

(51) Int. Cl.
| | | |
|---|---|---|
| *C08L 23/0861* | (2025.01) | |
| *C08F 2/44* | (2006.01) | |
| *C08F 18/08* | (2006.01) | |
| *C08F 218/08* | (2006.01) | |
| *C08F 218/12* | (2006.01) | |
| *B29C 48/00* | (2019.01) | |
| *B29C 48/08* | (2019.01) | |
| *B29C 48/285* | (2019.01) | |
| *B29K 23/00* | (2006.01) | |

(52) U.S. Cl.
CPC ............ *C08L 23/0861* (2013.01); *C08F 2/44* (2013.01); *C08F 18/08* (2013.01); *C08F 218/08* (2013.01); *C08F 218/12* (2013.01); *B29C 48/022* (2019.02); *B29C 48/08* (2019.02); *B29C 48/288* (2019.02); *B29K 2023/083* (2013.01)

(58) Field of Classification Search
CPC ...... C08F 18/08; C08F 218/08; C08F 218/12; C08L 23/0861

See application file for complete search history.

(56) References Cited

U.S. PATENT DOCUMENTS

| | | | |
|---|---|---|---|
| 2007/0106031 A1 | 5/2007 | Uchiumi et al. | |
| 2015/0105508 A1* | 4/2015 | Nakazawa | ............... B32B 7/12 |
| | | | 524/300 |
| 2019/0322817 A1* | 10/2019 | Seno | ......................... C08J 3/12 |

FOREIGN PATENT DOCUMENTS

| | | |
|---|---|---|
| TW | 200500203 A | 1/2005 |
| WO | WO2013146961 A1 | 10/2013 |
| WO | WO2015050222 A1 | 4/2015 |
| WO | WO2018124232 A1 | 7/2018 |
| WO | WO2018124233 A1 | 7/2018 |
| WO | WO2018124234 A1 | 7/2018 |

* cited by examiner

*Primary Examiner* — Joseph S Del Sole
*Assistant Examiner* — David L Miller
(74) *Attorney, Agent, or Firm* — MUNCY, GEISSLER, OLDS & LOWE, P.C.

(57) ABSTRACT

The instant disclosure relates to saponified pellets of an ethylene-vinyl ester based copolymer as well as a film and a multilayer structure formed therefrom. The saponified pellets of an ethylene-vinyl ester based copolymer has an ethylene content of 24-35 mole %, and the pellets have a turbidity of less than 300 NTU when dissolved in a 60% (w/w) methanol aqueous solution; or the pellet has an ethylene content of 36-48 mole %, and the pellets have a turbidity of less than 200 NTU when dissolved in a 80% (w/w) methanol aqueous solution. The present invention controls the amount of aggregates by controlling the turbidity of the saponified pellets of an ethylene-vinyl ester based copolymer dissolved in methanol aqueous to reduce the amount of gel produced after film formation.

11 Claims, No Drawings

ETHYLENE VINYL ESTER BASED COPOLYMER SAPONIFIED PELLETS AND FILM CONTAINING THE SAME

FIELD OF THE DISCLOSURE

The invention relates to a saponified material of an ethylene-vinyl ester based copolymer, and particularly, the saponified pellets of an ethylene-vinyl ester based copolymer have a specific turbidity as dissolved in a methanol aqueous solution. The invention also discloses a film and a multilayer structure formed from the saponified pellets of an ethylene-vinyl ester based copolymer.

BACKGROUND

Ethylene-vinyl ester based copolymers such as ethylene-vinyl alcohol copolymer (EVOH) resins are widely applied for multilayers to preserve perishable goods. For example, EVOH resins and multilayers are commonly used in the food packaging industry, the medical equipment and consumables industry, the pharmaceutical industry, the electronics industry, and the agrochemicals industry. EVOH resins are usually added into a multilayer as a unique layer serving as an oxygen barrier layer.

Currently, the conventional EVOH pellets/particles formed from EVOH resins often contain a significant amount of aggregates. This makes the films formed of such EVOH pellets have lots of gels therein and thus poor quality.

SUMMARY OF THE DISCLOSURE

It is found that the poor quality of conventional EVOH films is attributed to non-uniformly mixing or adding polymerization inhibitors insufficiently in the EVOH manufacturing process, a large amount of aggregates contained in EVOH pellets, high gel concentration in EVOH films, and/or high oxygen permeability (also termed as oxygen transmission rate herein) of EVOH films.

Therefore, there is sustained demand for films made from saponified pellets of an ethylene-vinyl ester based copolymer, which provide a small amount of gels and a low oxygen transmission rate (OTR).

The invention relates to saponified pellets of an ethylene-vinyl ester based copolymer, when having an ethylene content of 24-35 mole %, a turbidity of the pellets as dissolved in a 60% (w/w) methanol aqueous solution is less than 300 NTU; or when having an ethylene content of 36-48 mole %, a turbidity of the pellets as dissolved in an 80% (w/w) methanol aqueous solution is less than 200 NTU. In some circumstance, the saponified pellets of an ethylene-vinyl ester based copolymer have a turbidity of the pellets as dissolved in a 60% (w/w) methanol aqueous solution is 0.5-120 NTU when having an ethylene content of 24-35 mole %; or have a turbidity of the pellets as dissolved in an 80% (w/w) methanol aqueous solution is 0.5-120 NTU when having an ethylene content of 36-48 mole %. The saponified pellets of an ethylene-vinyl ester based copolymer can be used to prepare a film or a multilayer structure.

Additionally or alternatively, the saponified pellets of an ethylene-vinyl ester based copolymer include a polymerization inhibitor with a content of 1-850 ppm. In a preferred embodiment, the saponified pellets of an ethylene-vinyl ester based copolymer include a polymerization inhibitor with a content of 5-650 ppm. The polymerization inhibitor is a conjugated polyene. The polymerization inhibitor may be sorbic acid, cinnamic acid, 1,3-hexadiene or laurene.

According to at least one embodiment, the polymerization inhibitor is added by mixing via a mixer, and the mixer is a dynamic mixer or a static mixer. In some embodiment, a ratio of length to diameter of the mixer is 1.3-65 L/D.

According to at least one embodiment, the saponified pellets of an ethylene-vinyl ester based copolymer comprise an ethylene content and a saponification, wherein the ethylene content is about 24 to about 48 mole % and the saponification is greater than 99.5 mole %.

Alternatively, according to at least one embodiment, the saponified pellets of an ethylene-vinyl ester based copolymer may further have a boron content of 10-450 ppm. In some circumstance, in addition to the boron content of 10-450 ppm, the saponified pellets of an ethylene-vinyl ester based copolymer may also comprise alkali metals, lubricants and alkaline earth metals, their salts and/or mixtures thereof.

In other aspects of the invention, herein provides a film formed from the aforementioned saponified pellets of an ethylene-vinyl ester based copolymer. In some preferred embodiment, an oxygen transmission rate of the film at 23° C. and 65% RH is lower than 3.4 $cm^3 * 20\,\mu m/m^2 * 24\,Hr*atm$ according to ISO 14663-2.

Additionally or alternatively, herein provides a film formed from the aforementioned saponified pellets of an ethylene-vinyl ester based copolymer, wherein gel counts in the film are fewer than $1180/m^2$. In some circumstance, gel counts in the film are fewer than $600/m^2$.

In other aspects of the invention, herein provides a multilayer structure formed from the aforementioned saponified pellets of an ethylene-vinyl ester based copolymer. According to at least one embodiment, the multilayer structure, comprising: (a) at least one layer formed of the saponified pellets of an ethylene-vinyl ester based copolymer; (b) at least a polymer layer; and (c) at least an adhesive layer. The polymer layer can be for example: selected from a group consisting of a low density polyethylene layer, a polyethylene grafted maleic anhydride layer, a polypropylene layer, and a nylon layer. The adhesive layer can be a tie layer.

Surprisingly, in the process of manufacturing a saponified material of an ethylene-vinyl ester based copolymer, a large amount of initiators is added during polymerization, and the polymerized product contains a significant amount of initiators. Subsequently, an inhibitor is added to terminate reaction. At this time, if the inhibitor is added sufficiently and the polymerized product is mixed with the inhibitor uniformly, the reaction can be terminated without formation of aggregates. No gels are produced after filming of an ethylene-vinyl ester based copolymer saponified material. In case the additive inhibitor is not enough or the polymerized product is mixed non-uniformly with the inhibitor, the reaction cannot be terminated. The aggregates are generated due to continuous reaction. As such, gels are generated when the ethylene-vinyl ester based copolymer saponified material is filmed. In view of this, it is believed that no matter what the polymerization conditions and the inhibitor additive conditions are, the ethylene-vinyl ester based copolymer saponified material may contain fewer aggregates provided that the turbidity of the ethylene-vinyl ester based copolymer saponified pellets as dissolved in a methanol aqueous solution is within a certain range. Thereby, the amount of gels is reduced after film formation, and the oxygen transmission rate is lower.

DETAILED DESCRIPTION

The invention provides a saponified material of an ethylene-vinyl ester based copolymer and specifically, ethylene-vinyl alcohol copolymer (EVOH) for example. The saponified material of an ethylene-vinyl ester based copolymer may be in the form of particles/pellets, films, fibers, and others. The saponified material of an ethylene-vinyl ester based copolymer described herein is granulated to be one or more pellets in form and/or shape. Although in the context of the present invention, the described saponified material of an ethylene-vinyl ester based copolymer is granulated into one or more pellets, it may be processed into other forms, such as beads, cubes, fragments, shavings, and so on.

In some cases, the saponified material of an ethylene-vinyl ester based copolymer is in the form of pellets, which has a specific turbidity. Especially, when its ethylene content ranges from 24 to 35 mole %, the turbidity of the pellets as dissolved in a 60% (w/w) methanol aqueous solution is less than 300 NTU; or when its ethylene content ranges from 36 to 48 mole %, the turbidity of the pellets as dissolved in an 80% (w/w) methanol aqueous solution is less than 200 NTU. The saponified pellets of an ethylene-vinyl ester based copolymer can be used for film preparation.

While the ethylene content of the aforementioned pellets is 24-35 mole %, the turbidity of the pellets as dissolved in a 60% (w/w) methanol aqueous solution is, for example, less than 300 NTU, less than 275 NTU, less than 250 NTU, less than 225 NTU, less than 200 NTU, less than 175 NTU, less than 150 NTU, less than 125 NTU, less than 100 NTU, less than 75 NTU, less than 50 NTU, less than 25 NTU, less than 20 NTU, less than 15 NTU, less than 10 NTU, or less than 1 NTU. While the ethylene content of the aforementioned pellets is 36-48 mole %, the turbidity of the pellets as dissolved in an 80% (w/w) methanol aqueous solution is less than 200 NTU, e.g. less than 200 NTU, less than 175 NTU, less than 150 NTU, less than 125 NTU, less than 100 NTU, less than 75 NTU, less than 50 NTU, less than 25 NTU, less than 20 NTU, less than 15 NTU, less than 10 NTU, or less than 1 NTU. In a preferred embodiment, the ethylene content of the ethylene-vinyl ester based copolymer saponified pellets is 24-35 mole %, and the turbidity of the pellets as dissolved in a 60% (w/w) methanol aqueous solution is 0.5-120 NTU, e.g. 0.5-120 NTU, 0.5-100 NTU, 0.5-80 NTU, 0.5-60 NTU, 0.5-40 NTU, 0.5-20 NTU, 1-120 NTU, 1-100 NTU, 1-80 NTU, 1-60 NTU, 1-40 NTU, 1-20 NTU, 5-120 NTU, 5-100 NTU, 5-80 NTU, 5-60 NTU, 5-40 NTU, 5-20 NTU, 10-120 NTU, 10-100 NTU, 10-80 NTU, 10-60 NTU, 10-40 NTU, 10-20 NTU, 25-120 NTU, 25-100 NTU, 25-80 NTU, 25-60 NTU, 25-40 NTU, 50-120 NTU, 50-100 NTU, or 50-80 NTU; or the ethylene content thereof is 36-48 mole %, and the turbidity of the pellets as dissolved in an 80% (w/w) methanol aqueous solution is 0.5-120 NTU, e.g. 0.5-120 NTU, 0.5-100 NTU, 0.5-80 NTU, 0.5-60 NTU, 0.5-40 NTU, 0.5-20 NTU, 1-120 NTU, 1-100 NTU, 1-80 NTU, 1-60 NTU, 1-40 NTU, 1-20 NTU, 5-120 NTU, 5-100 NTU, 5-80 NTU, 5-60 NTU, 5-40 NTU, 5-20 NTU, 10-120 NTU, 10-100 NTU, 10-80 NTU, 10-60 NTU, 10-40 NTU, 10-20 NTU, 25-120 NTU, 25-100 NTU, 25-80 NTU, 25-60 NTU, 25-40 NTU, 50-120 NTU, 50-100 NTU, or 50-80 NTU.

The causes to generate aggregates in EVOH pellets may be affected by various complicated factors, such as EVOH having low ethylene content, EVOH with high polymerization, EVOH having high ethylene content, or EVOH being dehydrated-crosslinked. Although not bounded by any particular theory, it is believed that the saponified pellets of an ethylene-vinyl ester based copolymer may contain fewer aggregates provided that the turbidity is within a desired range when the ethylene-vinyl ester based copolymer saponified pellets are dissolved in a methanol aqueous solution. Thus, the amount of gels is reduced after film formation, and the oxygen transmission rate is lower.

The ethylene-vinyl ester based copolymer saponified pellets may contain ethylene. For example, the ethylene content of EVOH may be from about 24 to about 48 mole %, from about 20 to about 50 mole %, from about 25 to about 45 mole %, from about 28 to about 42 mole %, or from about 30 to about 40 mole %. The ethylene content is, for example, 24 mole %, 25 mole %, 26 mole %, 27 mole %, 28 mole %, 29 mole %, 30 mole %, 31 mole %, 32 mole %, 33 mole %, 34 mole %, 35 mole % or any between the two aforementioned values; or the ethylene content is, for example, 35 mole %, 36 mole %, 37 mole %, 38 mole %, 39 mole %, 40 mole %, 41 mole %, 42 mole %, 43 mole %, 44 mole %, 45 mole %, 46 mole %, 47 mole %, 48 mole % or any between the two aforementioned values.

Additionally/alternatively, the saponification of the EVOH resin composition 100 may be 90 mole % or higher, preferably 95 mole % or higher, more preferably 97 mole % or higher, and still more preferably 99.5 mole % or higher.

The saponified pellets of an ethylene-vinyl ester based copolymer include a polymerization inhibitor with a content of 1-850 ppm, e.g. 1-850 ppm, 1-800 ppm, 1-750 ppm, 1-700 ppm, 1-650 ppm, 1-600 ppm, 1-550 ppm, 1-500 ppm, 1-450 ppm, 1-400 ppm, 1-350 ppm, 1-300 ppm, 1-250 ppm, 1-200 ppm, 1-150 ppm, 1-100 ppm, 1-50 ppm, 5-850 ppm, 5-800 ppm, 5-750 ppm, 5-700 ppm, 5-650 ppm, 5-600 ppm, 5-550 ppm, 5-500 ppm, 5-450 ppm, 5-400 ppm, 5-350 ppm, 5-300 ppm, 5-250 ppm, 5-200 ppm, 5-150 ppm, 5-100 ppm, 5-50 ppm, 50-850 ppm, 50-800 ppm, 50-750 ppm, 50-700 ppm, 50-650 ppm, 50-600 ppm, 50-550 ppm, 50-500 ppm, 50-450 ppm, 50-400 ppm, 50-350 ppm, 50-300 ppm, 50-250 ppm, 50-200 ppm, 50-150 ppm, 50-100 ppm, 10-850 ppm, 10-800 ppm, 10-750 ppm, 10-700 ppm, 10-650 ppm, 10-600 ppm, 10-550 ppm, 10-500 ppm, 10-450 ppm, 10-400 ppm, 10-350 ppm, 10-300 ppm, 10-250 ppm, 10-200 ppm, 10-150 ppm, 10-100 ppm, 10-50 ppm, 100-850 ppm, 100-800 ppm, 100-750 ppm, 100-700 ppm, 100-650 ppm, 100-600 ppm, 100-550 ppm, 100-500 ppm, 100-450 ppm, 100-400 ppm, 100-350 ppm, 100-300 ppm, 100-250 ppm, 100-200 ppm, 300-850 ppm, 300-800 ppm, 300-750 ppm, 300-700 ppm, 300-650 ppm, or 300-600 ppm. In a preferred embodiment, the saponified pellets of an ethylene-vinyl ester based copolymer include a polymerization inhibitor with a content of 5-650 ppm. The polymerization inhibitor is conjugated polyenes, e.g. 2,3-dimethyl-1,3-butadiene, 2-tert-butyl-1,3-butadiene, 1,3-pentadiene, 2,4-dimethyl-1,3-pentadiene, 3,4-dimethyl-1,3-pentadiene, 3-ethyl-1,3-pentadiene, 2-methyl-1,3-pentadiene, 4-methyl-1,3-pentadiene, 1,3-hexadiene, 2,5-dimethyl-2,4-hexadiene, 1,3-octadiene, 1,3-cyclopentadiene, 1,3-cyclohexadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, isoprene, tropone, ocimene, fulvene, ferrandrene, myrcene, farnesene, phellandrene, cembrene, sorbic acids such as sorbic and the salts thereof, sorbate, abietic acid, and other conjugated diene with a conjugate structure of 2 carbon-carbon double bonds, as well as 1,3,5-hexatriene, 2,4,6-octatriene-1-carboxylic acid, eleostearic acid, wood oil, cholecalciferol, and other conjugated triene with a conjugate structure of 3 carbon-carbon double bonds. Two or more conjugate polyenes may be combined to use. The preferred conjugate polyene is sorbic, sorbate, sorbic salt and other sorbic acids, cinnamon acid, 1,3-hexadiene or myrcene.

The polymerization inhibitor is added by a mixer. The mixer may be a dynamic mixer, a general static mixer or a Noritake static mixer. For better mixing, the mixer has a specific length-to-diameter ratio, e.g. 1-70 L/D, 1-65 L/D, 1-60 L/D, 1-50 L/D, 1-40 L/D, 1-30 L/D, 1-20 L/D, 1-10 L/D, 1.3-70 LID, 1.3-65 LID, 1.3-60 L/D, 1.3-50 L/D, 1.3-40 L/D, 1.3-30 L/D, 1.3-20 L/D, 1.3-10 L/D, 5-70 L/D, 5-65 L/D, 5-60 L/D, 5-50 L/D, 5-40 L/D, 5-30 L/D, 5-20 L/D, 5-10 LID, 20-70 L/D, 20-65 L/D, 20-60 L/D, 20-50 L/D, 20-40 L/D, 40-70 L/D, 40-65 L/D, 40-60 L/D, 40-50 L/D, or 60-70 L/D.

The saponified pellets of an ethylene-vinyl ester based copolymer may in some cases comprise boron compounds and/or boric acid and/or cinnamon acid and/or alkali metals and/or conjugate polyene and/or lubricants and/or alkaline earth metals. The above substances may give the ethylene-vinyl ester based copolymer saponified pellets better properties. These substances are commonly found in the ethylene-vinyl ester based copolymer saponified pellets, making their properties more appropriate. The coloration after heating can be suppressed if the content of the compound with a conjugate polyene structure is 1-30000 ppm per unit weight of the ethylene-vinyl ester based copolymer saponified pellets, and so the thermal stability is improved. Moreover, the alkali metal or alkaline earth metal compound with a content of 1-1000 ppm, on the basis of metals, per unit weight of the ethylene-vinyl ester based copolymer saponified pellets may contribute to better longrun formability. Besides, if the ethylene-vinyl ester based copolymer saponified pellets contain a lubricant of 1-300 ppm per unit weight, the processability thereof can be enhanced.

Additionally/alternatively, according to other aspects of the present invention, the saponified pellets of an ethylene-vinyl ester based copolymer may contain boron of 10-450 ppm. Not bounded by any particular theory, it is believed that by adding boron compounds to the ethylene-vinyl ester based copolymer saponified pellets with a boron content of 10-450 ppm, adhesion can be decreased or eliminated during extrusion by a screw extruder. As such, the thickness uniformity and flexibility of the films are improved. In some cases, the boron content of the ethylene-vinyl ester based copolymer saponified pellets may be 10-450 ppm, e.g. from about 10 to about 450 ppm, from about 10 to about 400 ppm, from about 10 to about 350 ppm, from about 10 to about 300 ppm, from about 10 to about 275 ppm, from about 10 to about 250 ppm, from about 10 to about 225 ppm, from about 10 to about 200 ppm, from about 10 to about 175 ppm, from about 20 to about 450 ppm, from about 20 to about 400 ppm, from about 20 to about 350 ppm, from about 20 to about 300 ppm, from about 20 to about 275 ppm, from about 20 to about 250 ppm, from about 20 to about 225 ppm, from about 20 to about 200 ppm, from about 20 to about 175 ppm, from about 60 to about 450 ppm, from about 60 to about 400 ppm, from about 60 to about 350 ppm, from about 60 to about 300 ppm, from about 60 to about 275 ppm, from about 60 to about 250 ppm, from about 60 to about 225 ppm, from about 60 to about 200 ppm, from about 60 to about 175 ppm, from about 100 to about 450 ppm, from about 100 to about 400 ppm, from about 100 to about 350 ppm, from about 100 to about 300 ppm, from about 100 to about 275 ppm, from about 100 to about 250 ppm, from about 100 to about 225 ppm, from about 100 to about 200 ppm, from about 100 to about 175 ppm, from about 140 to about 450 ppm, from about 140 to about 400 ppm, from about 140 to about 350 ppm, from about 140 to about 300 ppm, from about 140 to about 275 ppm, from about 140 to about 250 ppm, from about 140 to about 225 ppm, from about 140 to about 200 ppm, from about 180 to about 450 ppm, from about 180 to about 400 ppm, from about 180 to about 350 ppm, from about 180 to about 300 ppm, from about 180 to about 275 ppm, from about 180 to about 250 ppm, from about 180 to about 225 ppm, from about 220 to about 450 ppm, from about 220 to about 400 ppm, from about 220 to about 350 ppm, from about 220 to about 300 ppm, from about 220 to about 275 ppm based on the total weight of ethylene-vinyl ester based copolymer saponified pellets.

In some cases, boron compounds may include boric acid or the metal salts thereof. Examples of metal salts include, but not limited to, calcium borate, cobalt borate, zinc borate (e.g. zinc tetraborate, zinc metaborate), aluminum potassium borate, ammonium borate (e.g. ammonium metaborate, ammonium tetraborate, ammonium pentaborate, ammonium octabonate), cadmium borate (e.g. cadmium orthoborate, cadmium tetraborate), potassium borate (e.g. potassium metaborate, potassium tetraborate, potassium pentaborate, potassium hexaborate, potassium octaborate), silver borate (e.g. silver metaborate, silver tetraborate), copper borate (e.g. copper(II) borate, copper metaborate, copper tetraborate), sodium borate (e.g. sodium metaborate, sodium diborate, sodium tetraborate, sodium pentaborate, sodium hexaborate, sodium octaborate), lead borate (e.g. lead metaborate, lead hexaborate), nickel borate (e.g. nickel orthoborate, nickel diborate, nickel tetraborate, nickel octaborate), barium borate (e.g. barium orthoborate, barium metaborate, barium diborate, barium tetraborate), bismuth borate, magnesium borate (e.g. magnesium orthoborate, magnesium diborate, magnesium metaborate, trimagnesium tetraborate, pentamagnesium tetraborate), manganese borate (e.g. manganese(I) borate, manganese metaborate, manganese tetraborate), lithium borate (e.g. lithium metaborate, lithium tetraborate, lithium pentaborate), the salts thereof or the combination thereof. Such may include borate minerals, for example, borax, cainite, inyoite, kotoite, ascharite/suanite, and szaibelyite. Among them, borax, boric acid and sodium borate (e.g. sodium metaborate, sodium diborate, sodium tetraborate, sodium pentaborate, sodium hexaborate, and sodium octaborate) are preferred.

In another aspect, the invention provides a film formed from the saponified pellets of an ethylene-vinyl ester based copolymer as described above. The methods and equipment suitable for preparing films from ethylene-vinyl ester based copolymer saponified pellets may include those known by persons having ordinary skill in the art. Preferably, the film is highly resistant to gas. The gas barrier property of films may be assessed by measuring the oxygen transmission rate (OTR) of films. The gas barrier property of films can be determined by the OX-TRAN Model 2/21 OTR tester (manufactured by Mocon Company) in accordance with ISO 14663-2. In some embodiments, according to ISO 14663-2, an oxygen transmission rate of the film at 23° C. and 65% RH is lower than 3.4, e.g. lower than 3.4, lower than 3, lower than 2.8, lower than 2.6, lower than 2.4, lower than 2.2, lower than 2, lower than 1.8, lower than 1.6, lower than 1.4, lower than 1.2, lower than 1, lower than 0.8, lower than 0.6, or lower than 0.4. In a preferred embodiment, according to ISO 14663-2, an oxygen transmission rate of the film at 23° C. and 65% RH is 0.05-3, e.g. 0.05-3, 0.05-2.7, 0.05-2.5, 0.05-2.3, 0.05-2.1, 0.05-1.9, 0.05-1.7, 0.05-1.5, 0.05-1.3, 0.05-1.1, 0.05-0.9, 0.05-0.7, 0.05-0.5, 0.1-3, 0.1-2.7, 0.1-2.5, 0.1-2.3, 0.1-2.1, 0.1-1.9, 0.1-1.7, 0.1-1.5, 0.1-1.3, 0.1-1.1, 0.1-0.9, 0.1-0.7, 0.1-0.5, 0.3-3, 0.3-2.7, 0.3-2.5, 0.3-2.3, 0.3-2.1, 0.3-1.9, 0.3-1.7, 0.3-1.5, 0.3-1.3, 0.3-1.1, 0.3-0.9, 0.3-0.7, 0.3-0.5, 0.5-3, 0.5-2.7, 0.5-2.5, 0.5-2.3, 0.5-2.1, 0.5-1.9, 0.5-1.7, 0.5-1.5, 0.5-1.3, 0.5-1.1, 0.5-0.9, 1-3, 1-2.7, 1-2.5, 1-2.3, 1-2.1, 1-1.9, 1-1.7, 1-1.5, 1.2-3, 1.2-2.7, 1.2-2.5, 1.2-2.3, 1.2-2.1, 1.2-1.9, 1.2-1.7, or 2-3.

In still another aspect, the invention provides a film formed from the saponified pellets of an ethylene-vinyl ester based copolymer as described above. In some embodiments, gel counts in the film are fewer than $1180/m^2$, e.g. fewer than $1180/m^2$, fewer than $1000/m^2$, fewer than $900/m^2$, fewer than $800/m^2$, fewer than $700/m^2$, fewer than $600/m^2$, fewer than $700/m^2$, fewer than $500/m^2$, fewer than $400/m^2$, fewer than $300/m^2$, fewer than $200/m^2$ 或小於 $100/m^2$. In some preferred circumstance, gel counts in the film are fewer than $600/m^2$, fewer than $550/m^2$, fewer than $500/m^2$, fewer than $450/m^2$, fewer than $400/m^2$, fewer than $350/m^2$, fewer than $300/m^2$, fewer than $250/m^2$, fewer than $200/m^2$, fewer than $150/m^2$ or fewer than $100/m^2$.

In a further aspect, the invention provides a multilayer structure, which comprises at least one layer formed of the ethylene-vinyl ester based copolymer saponified pellets of the invention, at least a polymer layer and at least an adhesive layer. The polymer layer may be selected from a low density polyethylene layer, a polyethylene grafted maleic anhydride layer, a polypropylene layer, a nylon layer, and the combination thereof. The adhesive layer is a tie layer such as ARKEMA OREVAC 18729 from ARKEMA Company.

EXAMPLES

The following non-restrictive embodiments for various aspects of the invention are provided primarily to illustrate the present invention in all respects and the benefits achieved therewith.

Example 1

A non-restrictive method of preparing EVOH particles from EVOH resin compositions is provided as follows. With similar methods to the following one, seven non-restrictive examples for EVOH resin compositions (Examples EVOH 1-7) and eight comparative examples for EVOH resin compositions (Comparative Examples EVOH 1-8) are prepared. However, the embodied methods to prepare Examples EVOH 1-7 and Comparative Examples EVOH 1-8 are generally different from the following method in one or more respects.

Ethylene, vinyl acetate (VAM), methanol, and an initiator are added to a reactor and polymerized in specific conditions. A large amount of initiators is added during polymerization. The polymerized product thus contains a significant amount of initiators. Subsequently, an inhibitor is added to terminate reaction. After polymerization, the ethylene-vinyl acetate copolymer (termed as "EVAC" herein) solution and the polymerization inhibitor are mixed by a special mixer. The mixed solution is then subject to de-monomer, alkalization, granulation, drying, and other procedures, to make EVOH particles/pellets.

Specifically, the ethylene-vinyl acetate copolymer with specific ethylene content is saponified to prepare an EVOH polymer, wherein the saponification is 99.5%. Next, EVOH is dissolved in a solution containing methanol and water (in a ratio of 70:30). The EVOH solid content of the solution is 41 wt. %. The solution is placed at 60° C.

Thereafter, the aforementioned solution of methanol, water and EVOH is granulated by underwater pelletization. Specifically, the methanol/water/EVOH solution described above is pumped into a feed pipe by a pump at a flow rate of 120 L/min, which is then fed into an input pipe with a diameter of 2.8 mm, and cut using a rotary knife at 1500 rpm. The EVOH pellets are chilled with water at 5° C. Next, the EVOH pellets are centrifuged to separate from EVOH particles. The separated EVOH particles are rinsed with water, and dried through 3 different dryers (Table 1) to obtain EVOH pellets.

Example 2

According to the following method, Examples EVOH pellets 1-7 are used to form films individually. Examples EVOH pellets 1-7 and Comparative Examples EVOH pellets 1-8 are transferred to a single-layer T-die cast-extruder (optical control system MEV4) for film preparation. The thickness of the films formed from Examples EVOH pellets 1-7 and Comparative Examples EVOH pellets 1-8 is 20 μm each. The temperature of the extruder is set to 220° C. The temperature of the mold (i.e. T-die) is set to 230° C. The screw rotates at 7 rpm (rotations/minutes).

Example 3

Examples EVOH pellets 1-7 and Comparative Examples EVOH pellets 1-8 are evaluated to estimate the properties of these EVOH pellets and the films formed therefrom. As described above, Examples EVOH pellets 1-7 and Comparative Examples EVOH pellets 1-8 are prepared according to similar methods to Example 1. But the methods of preparing EVOH pellets 1-8 are different in the following respects regarding EVOH pellet preparation:

Experimental changes in polymerization reaction: polymerization temperature, polymerization pressure, VAM/methanol ratios;

Experimental changes in adding inhibitors: additive ratios of inhibitors to initiators, kinds of inhibitors;

Experimental changes in mixing polymerized products with inhibitors: types of mixers, length of mixers;

Experimental changes in de-monomer, alkalization, filtration with water: whether to filter or not.

The process variations for experiments are summarized in Table 1 below.

TABLE 1

| parameter variation | varied range |
| --- | --- |
| additive amount of inhibitors (ppm) | 10-1000 |
| kinds of inhibitors | conjugated polyenes |
| mixer type for inhibitors | dynamic mixer or static mixer |
| mixer length (L/D) | 1.3-65 |
| pressure drop in mixers (kg/cm$^2$) | 0.02-1.2 |
| viscosity of polymers (cp) | 420-1500 |
| reaction pressure (kg/cm$^2$) | 28-70 |
| reaction temperature | 40-90° C. |
| methanol/VAM ratio | 5-60 |
| additive amount of initiators (ppm) | 50-500 |
| solid content of products (%) | 10-70 |

The turbidity of EVOH pellets in a methanol aqueous solution is further evaluated. By similar methods to Example 2, Examples EVOH 1-7 and Comparative Examples EVOH 1-8 are individually used to form films, which are assessed by gel counts and oxygen transmission rate analysis.

Table 2 provides the polymerization conditions, the inhibitor additive conditions and some characteristics (i.e. the content of EVOH inhibitors, the turbidity in a methanol aqueous solution) for Examples EVOH pellets 1-4 and Comparative Examples EVOH pellets 1-4, while Table 3 provides those items for Examples EVOH pellets 5-7 and Comparative Examples EVOH pellets 5-8. Tables 2 and 3 also provide gel generation and oxygen transmission rates of the films formed from Examples EVOH 1-7 and Comparative Examples EVOH 1-8.

TABLE 2

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| polymerization conditions | ethylene content (%) | 27 | 24 | 32 | 35 | 32 | 29 | 27 | 35 |
|  | reaction temperature | 50° C. | 90° C. | 40° C. | 70° C. | 30° C. | 100° C. | 60° C. | 80° C. |
|  | reaction pressure (kg/cm$^2$) | 32 | 28 | 39 | 43 | 39 | 35 | 32 | 43 |
|  | methanol/VAM (%) | 20 | 5 | 60 | 40 | 70 | 40 | 0 | 50 |
|  | initiator additive amount (ppm) | 200 | 100 | 500 | 400 | 600 | 5 | 1000 | 10 |
|  | solid content of products (%) | 40 | 70 | 10 | 20 | 0 | 40 | 80 | 30 |
| inhibitor additive conditions | inhibitor additive amount (ppm) | 150 | 1000 | 100 | 40 | 200 | 200 | 10 | 40 |
|  | inhibitor additive amount/initiator additive amount | 0.75 | 10 | 0.2 | 0.1 | 0.33 | 40 | 0.01 | 4 |
|  | kinds of inhibitors | sorbic acid | sorbic acid | cinnamic acid | 1,3-hexadiene | sorbic acid | lauric acid | butadiene | hexene |
|  | mixer type for inhibitors | dynamic mixer | static mixer | static mixer | Noritake static mixer | static mixer | dynamic mixer | w/o mixer | batch drum mixer |
|  | length of mixers (L/D) | 65 | 20 | 1.3 | 20 | 30 | 1000 | X | X |
|  | pressure drop | 0.6 | 1.2 | 0.02 | 0.1 | 0.01 | 0.5 | X | 0.5 |
|  | viscosity of polymers (cp) | 600 | 1500 | 1000 | 420 | 100 | 800 | 5400 | 400 |
|  | filtered or not | X | X | X | ○ | X | X | ○ | X |
|  | size of filters | X | X | X | 20 | X | X | 100 | X |
|  | methanol/water ratio (%) | 60 | 60 | 60 | 60 | 60 | 60 | 60 | 60 |
| characteristics | EVOH inhibitor content (ppm) | 130 | 580 | 5 | 20 | 110 | 210 | 0 | 10 |
|  | turbidity of EVOH in methanol aqueous solution | 0.5 | 35 | 18 | 120 | 315 | 450 | 718 | 321 |
| film performance | gel counts in EVOH films | 75 | 432 | 120 | 82 | not filmed | 1342 | 2464 | 1765 |
|  | OTR of EVOH films | 0.3 | 0.1 | 0.35 | 0.6 | not filmed | 4.1 | 10.1 | 6.3 |

TABLE 3

|  |  | Example 5 | Example 6 | Example 7 | Comparative Example 5 | Comparative Example 6 | Comparative Example 7 | Comparative Example 8 |
|---|---|---|---|---|---|---|---|---|
| polymerization conditions | ethylene content (%) | 36 | 44 | 48 | 48 | 36 | 38 | 44 |
|  | reaction temperature | 60° C. | 80° C. | 40° C. | 30° C. | 50° C. | 100° C. | 50° C. |
|  | reaction pressure (kg/cm$^2$) | 44 | 60 | 70 | 70 | 44 | 32 | 60 |
|  | methanol/VAM (%) | 30 | 20 | 50 | 70 | 0 | 20 | 50 |
|  | initiator additive amount (ppm) | 50 | 100 | 350 | 200 | 1000 | 100 | 500 |
|  | solid content of products (%) | 25 | 60 | 60 | 0 | 40 | 90 | 40 |
| inhibitor additive conditions | inhibitor additive amount (ppm) | 10 | 20 | 200 | 200 | 10 | 10000 | 5 |
|  | inhibitor additive amount/initiator additive amount | 0.5 | 0.2 | 0.57 | 1 | 0.01 | 100 | 0.01 |
|  | kinds of inhibitors | sorbic acid | laurene | 1,3-hexadiene | sorbic acid | hexene | sorbic acid | cinnamic acid |
|  | mixer type for inhibitors | static mixer | dynamic mixer | dynamic mixer | static mixer | dynamic mixer | batch mixer | w/o mixer |
|  | length of mixers (L/D) | 40 | 5 | 55 | 60 | 0.65 | X | X |
|  | pressure drop | 0.8 | 0.04 | 1 | 0.02 | 0.1 | 3.6 | 2.1 |
|  | viscosity of polymers (cp) | 900 | 1100 | 1200 | 130 | 1000 | 4200 | 1300 |
|  | filtered or not | X | X | ○ | X | X | ○ | ○ |
|  | size of filters | X | X | 100 | X | X | 20 | 100 |
|  | methanol/water ratio (%) | 80 | 80 | 80 | 80 | 80 | 80 | 80 |

TABLE 3-continued

| | | Example 5 | Example 6 | Example 7 | Comparative Example 5 | Comparative Example 6 | Comparative Example 7 | Comparative Example 8 |
|---|---|---|---|---|---|---|---|---|
| characteristics | EVOH inhibitor content (ppm) | 15 | 10 | 150 | 150 | 0 | 1200 | 410 |
| | turbidity of EVOH in methanol aqueous solution | 0.5 | 12 | 70 | 220 | 412 | 513 | 240 |
| film performance | gel counts in EVOH films | 210 | 110 | 240 | 1180 | 1385 | 1962 | 1762 |
| | OTR of EVOH films | 1.2 | 0.8 | 2.4 | 4.1 | 5.4 | 4.3 | 3.4 |

In order to evaluate the turbidity of Examples EVOH 1-7 and Comparative Examples EVOH 1-8, an EVOH sample of about 2.5 grams (g) is weighted and placed into a 250 ml conical flask. A methanol aqueous solution of 84 g is formulated with 50.3 g of methanol and 33.6 g of water, and added into the 250 ml conical flask. The solvent and the sample are heated under reflux in the conical flask for 2 hours until dissolving (the hot plate temperature is 450° C.). After that, the hot plate is cooled down to 60° C. The solution is then determined using the Turbidimeter HI98703 instrument in accordance with an ISO-7027 method. As adding EVOH pellets to methanol/water according to the method above, the solution becomes cloud since a trace amount of aggregates in EVOH particles are insoluble in methanol/water. The amount of aggregates can be analyzed by a turbidity meter.

The gel generation is evaluated for the films formed from Examples EVOH 1-7 and Comparative Examples EVOH 1-8. The EVOH is processed into a monolayer film in advance. The gel counts in the monolayer film are analyzed by FSA-100, which aims mainly at the gels smaller than 100 μm.

The oxygen transmission rate (OTR) is evaluated for the films formed from Examples EVOH 1-7 and Comparative Examples EVOH 1-8. The EVOH is processed into a monolayer film, of which gas barrier test is carried out by OTR. The test method is performed according to ISO 14663-2. The test condition is 23° C./65% RH. The instrument is OXTRAN 2/21 manufactured by Mocon Company, measured in $cm^3*20$ μm/$m^2$*24 Hr*atm.

The results show that Examples EVOH 1-4 contain ethylene of 24%-35%, and the gel counts in the films formed from Examples EVOH 1-4 (75-432/$m^2$) is much fewer than the gel counts in the films formed from Comparative Examples EVOH 1-4 (1342-2464/$m^2$). That is, when EVOH has an ethylene content of 24%-35%, some expected effects may be achieved as long as the turbidity in a 60% methanol aqueous solution is less than 300 NTU, no matter what the polymerization conditions and the inhibitor additive conditions are.

Examples EVOH 5-7 have an ethylene content of 36%-48%, and the gel counts in the films formed from Examples EVOH 5-7 (110-240/$m^2$) is much fewer than the gel counts in the films formed from Comparative Examples EVOH 5-8 (1180-1962/$m^2$). This means that as the turbidity of EVOH with an ethylene content of 36%-48% in an 80% methanol aqueous solution is less than 200 NTU, some desired effects may be achieved regardless of the polymerization conditions and the inhibitor additive conditions.

It can be seen from experiments that the reasons for aggregate generation are quite complicated, and may be affected by many process variations, such as the types of mixers, the length of mixers, the amount of inhibitors, the kinds of inhibitors, the reaction temperature, the reaction pressure, the ratio of methanol/VAM, and so on. The size of aggregates varies too much to remove them by a filter effectively. As shown in Comparative Examples EVOH 3, 7 and 8, even though a filter with 20 or 100 μm mesh is used for filtration in the process of preparing EVOH, the films formed from Comparative Examples EVOH 3, 7 and 8 still contain a significant amount of gels that is beyond the desired range of the present invention. Although not bounded by any particular theory, it is believed that if the turbidity of the obtained EVOH as dissolved in a methanol aqueous solution is controlled within a desired range, it is supposed to be the EVOH from well mixing of inhibitors with polymers. Such EVOH contains fewer aggregates, and hence the amount of gels is reduced after film formation.

Furthermore, the oxygen transmission rate of the films formed from Examples EVOH 1-7 is about 0.1-2.4 $cm^3*20$ μm/$m^2$*24 Hr atm; the oxygen transmission rate of the films formed from Comparative Examples EVOH 1-8 is about 3.4-10.1 $cm^3*20$ μm/$m^2$*24 Hr*atm. In light of the test results, the oxygen transmission rate of the films formed from EVOH can be reduced once the turbidity of the resultant EVOH as dissolved in a methanol aqueous solution is controlled within a specific range. As shown in Tables 2 and 3, the turbidity of Comparative Examples EVOH 1-8 dissolved in a methanol aqueous solution exceeds the desired range of the invention. The test results show that all the films formed from Comparative Examples EVOH 1-8 have a high oxygen transmission rate (about 3.4-10.1 $cm^3*20$ μm/$m^2$*24 Hr*atm). The EVOH film with a low oxygen transmission rate may be used to produce various high oxygen barrier films, sheets and packaging containers.

In summary, the saponified pellets of an ethylene-vinyl ester based copolymer according to the invention have a specific turbidity in the methanol aqueous solution. Especially, when the ethylene content ranges from 24-35 mole %, the turbidity of the pellets as dissolved in a 60% (w/w) methanol aqueous solution is less than 300 NTU; or when the ethylene content ranges from 36-48 mole %, the turbidity of the pellets as dissolved in an 80% (w/w) methanol aqueous solution is less than 200 NTU. In the process of manufacturing a saponified material of an ethylene-vinyl ester based copolymer, if the inhibitor is not added sufficiently or the polymerized product is not mixed with the inhibitor uniformly, a large amount of gels may be generated after film formation. For this, it is found that no matter how the polymerization conditions and the inhibitor additive conditions change, the ethylene-vinyl ester based copolymer saponified pellets may contain fewer aggregates provided that the turbidity of the ethylene-vinyl ester based copolymer saponified pellets as dissolved in a methanol aqueous solution is within a desired range. Accordingly, the amount of gels is reduced after film formation, and the oxygen transmission rate is lower.

As used herein, all ranges provided are meant to include every specific range within, and combination of sub ranges between, the given ranges. Additionally, all ranges provided herein are inclusive of the end points of such ranges, unless stated otherwise. Thus, a range from 1 to 5 includes specifically 1, 2, 3, 4, and 5, as well as sub ranges such as 2-5, 3-5, 2-3, 2-4, 1-4, etc.

All publications and patent applications cited in this specification are herein incorporated by reference, and for any and all purposes, as if each individual publication or patent application is specifically and individually indicated to be incorporated by reference. In the event of an inconsistency between the present disclosure and any publication or patent application incorporated herein by reference, the present disclosure controls.

As used herein, the terms "comprising," "having," and "including" are used in their open and non-limiting sense. The terms "a," "an," and "the" are understood to encompass the plural as well as the singular. The expression "one or more" means "at least one" and thus may include an individual characteristic or mixtures/combinations.

Other than in the operating examples, or where otherwise indicated, all numbers expressing quantities of ingredients and/or reaction conditions may be modified in all instances by the term "about," meaning within ±5% of the indicated number. The term "substantially free" or "essentially free" as used herein means that there is less than about 2% of the specific characteristic. All elements or characteristics positively set forth in this disclosure can be negatively excluded from the claims.

What is claimed is:

1. Saponified pellets of an ethylene-vinyl ester based copolymer having an ethylene content of 24-48 mole %, when the ethylene content is 24-35 mole %, a turbidity of the pellets as dissolved in a 60 wt % methanol aqueous solution is less than 300 NTU; or when the ethylene content is 36-48 mole %, a turbidity of the pellets as dissolved in an 80 wt % methanol aqueous solution is less than 200 NTU, wherein the measurement method of the turbidity of the pellets dissolved in the 60 wt % methanol aqueous solution or in the 80 wt % methanol aqueous solution is to weight the pellets of 2.5 grams (g) and place the pellets into a 250 ml conical flask, and a 60 wt % or 80 wt % methanol aqueous solution of 84 g is added to the 250 ml conical flask, and the solvent and the pellets are heated under reflux in the conical flask for 2 hours until dissolving with the temperature of a hot plate is 450° C., and after that, the hot plate is cooled down to 60° C., and the solution turbidity is then determined using a Turbidimeter HI98703 instrument in accordance with ISO-7027 method.

2. The saponified pellets of an ethylene-vinyl ester based copolymer according to claim 1, wherein when having an ethylene content of 24-35 mole %, a turbidity of the pellets as dissolved in a 60 wt % methanol aqueous solution is 0.5-120 NTU; or when having an ethylene content of 36-48 mole %, a turbidity of the pellets as dissolved in an 80 wt % methanol aqueous solution is 0.5-120 NTU.

3. The saponified pellets of an ethylene-vinyl ester based copolymer according to claim 1, wherein the pellets include a polymerization inhibitor with a content of 1-850 ppm.

4. The saponified pellets of an ethylene-vinyl ester based copolymer according to claim 3, wherein a content of the polymerization inhibitor is 5-650 ppm.

5. The saponified pellets of an ethylene-vinyl ester based copolymer according to claim 3, wherein the polymerization inhibitor is a conjugated polyene.

6. The saponified pellets of an ethylene-vinyl ester based copolymer according to claim 3, wherein the polymerization inhibitor is sorbic acid, cinnamic acid, 1,3-hexadiene or myrcene.

7. The saponified pellets of an ethylene-vinyl ester based copolymer according to claim 3, wherein the polymerization inhibitor is added by mixing via a mixer, and the mixer is a dynamic mixer or a static mixer.

8. The saponified pellets of an ethylene-vinyl ester based copolymer according to claim 7, wherein a ratio of length to diameter of the mixer is 1.3-65 L/D.

9. The saponified pellets of an ethylene-vinyl ester based copolymer according to claim 1, having a boron content of 10-450 ppm.

10. The saponified pellets of an ethylene-vinyl ester based copolymer according to claim 1, further comprising a group consisting of alkali metals, lubricants and alkaline earth metals, or a combination thereof.

11. The saponified pellets of an ethylene-vinyl ester based copolymer according to claim 1, wherein a saponification for the saponified pellets of an ethylene-vinyl ester based copolymer is greater than 99.5 mole %.

* * * * *